(12) United States Patent
Han et al.

(10) Patent No.: US 10,836,235 B2
(45) Date of Patent: Nov. 17, 2020

(54) HEATING, VENTILATION AND AIR CONDITIONING SYSTEM OF VEHICLE

(71) Applicants: HYUNDAI MOTOR COMPANY, Seoul (KR); KIA MOTORS CORPORATION, Seoul (KR)

(72) Inventors: Jongwan Han, Suwon-Si (KR); Il Suk Yang, Hwaseong-Si (KR); Soo Hyung Woo, Yongin-Si (KR); Danghee Park, Seoul (KR); Yong Beom Park, Gunpo-Si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 119 days.

(21) Appl. No.: 16/212,189

(22) Filed: Dec. 6, 2018

(65) Prior Publication Data
US 2020/0114729 A1    Apr. 16, 2020

(30) Foreign Application Priority Data

Oct. 11, 2018  (KR) .................. 10-2018-0120830

(51) Int. Cl.
*B60H 1/02* (2006.01)
*B60H 1/00* (2006.01)

(52) U.S. Cl.
CPC ......... *B60H 1/025* (2013.01); *B60H 1/00021* (2013.01); *B60H 1/00842* (2013.01)

(58) Field of Classification Search
CPC .......................... B60H 1/025; B60H 1/00842; B60H 1/00021; B60H 1/00028; B60H 1/00057; B60H 2001/00092; B60H 1/00664; B60H 2001/00721; B60H 1/00835;
(Continued)

(56) References Cited

U.S. PATENT DOCUMENTS 4,072,186 A * 2/1978 Barton ............... B60H 1/00057
                                                           165/43
4,320,628 A * 3/1982 Okajima ........... B60H 1/00849
                                                          165/248
(Continued)

FOREIGN PATENT DOCUMENTS

JP       58170614 A  * 10/1983  ......... B60H 1/00007
JP    2013-113182 A     6/2013

OTHER PUBLICATIONS

JP-58170614-A—Machine English translation (Year: 1983).*

*Primary Examiner* — Jianying C Atkisson
*Assistant Examiner* — Jose O Class-Quinones
(74) *Attorney, Agent, or Firm* — Morgan, Lewis & Bockius LLP

(57) ABSTRACT

A heating, ventilation and air conditioning (HVAC) system of a vehicle includes: an indoor air conditioning circuit which produces to supply cooling air to a vehicle interior by heat-exchanging inflow air through an indoor air inlet or an outdoor air inlet with an evaporator, and which produces to supply warm air to the vehicle interior or to discharge to the outside of the vehicle interior by heat-exchanging inflow air with a heat exchanger. The heat exchanger is connected with an engine cooling circuit so that engine coolant is used as a heat source of the heat exchanger, thereby improving the cooling performance of the ERG cooler.

6 Claims, 6 Drawing Sheets

(58) Field of Classification Search
CPC ...... B60H 1/00849; B60H 2001/00928; B60H 2001/3266
See application file for complete search history.

(56) References Cited

U.S. PATENT DOCUMENTS

| | | | | |
|---|---|---|---|---|
| 4,385,503 A * | 5/1983 | Okura | ................ | B60H 1/00849 165/250 |
| 4,625,911 A * | 12/1986 | Tomita | .................. | B60H 1/032 237/12.3 A |
| 4,821,792 A * | 4/1989 | Bednarek | ........... | B60H 1/00007 165/231 |
| 5,062,352 A * | 11/1991 | Ostrand | ............. | B60H 1/00057 165/42 |
| 5,180,004 A * | 1/1993 | Nguyen | ............... | B60H 1/3227 165/135 |
| 5,291,941 A * | 3/1994 | Enomoto | ........... | B60H 1/00007 165/62 |
| 5,641,016 A * | 6/1997 | Isaji | .................. | B60H 1/00007 165/43 |
| 6,073,456 A * | 6/2000 | Kawai | .................... | B60H 1/004 62/133 |
| 6,192,698 B1 * | 2/2001 | Kakehashi | ......... | B60H 1/00064 165/203 |
| 6,321,697 B1 * | 11/2001 | Matsuda | ................. | F01P 7/165 123/41.29 |
| 6,688,120 B2 * | 2/2004 | Aoki | ...................... | B60H 1/005 62/133 |
| 8,966,913 B2 * | 3/2015 | Oh | ..................... | B60H 1/00428 62/187 |
| 9,163,603 B2 * | 10/2015 | Wakou | ............... | B60H 1/00778 |
| 9,404,409 B2 * | 8/2016 | Pursifull | ............ | F01N 5/02 |
| 2001/0040061 A1 * | 11/2001 | Matuda | ................ | B60L 3/0061 180/68.2 |
| 2002/0134540 A1 * | 9/2002 | Ieda | .................. | B60H 1/00842 165/204 |
| 2003/0010488 A1 * | 1/2003 | Watanabe | ............ | F28D 1/0408 165/202 |
| 2003/0021699 A1 * | 1/2003 | Miyagawa | ........... | B60H 1/3216 417/223 |
| 2005/0257547 A1 * | 11/2005 | Hirao | ................. | B60H 1/00907 62/244 |
| 2006/0185364 A1 * | 8/2006 | Chalgren | ............ | F02B 29/0493 60/599 |
| 2009/0133415 A1 * | 5/2009 | Major | .................... | B60H 1/004 62/115 |
| 2010/0043470 A1 * | 2/2010 | Kang | ................. | B60H 1/00064 62/239 |
| 2011/0083451 A1 * | 4/2011 | Kwon | ............... | B60H 1/00835 62/61 |
| 2012/0037352 A1 * | 2/2012 | Osaka | ................ | B60H 1/00278 165/202 |
| 2012/0160447 A1 * | 6/2012 | Kinomura | ................ | F01P 11/20 165/51 |
| 2013/0298883 A1 * | 11/2013 | Archer | ................... | F02M 26/28 123/568.12 |
| 2014/0216684 A1 * | 8/2014 | Goenka | ............. | B60H 1/00335 165/59 |
| 2014/0224448 A1 * | 8/2014 | Uppuluri | ............ | B60H 1/00071 165/42 |
| 2015/0107566 A1 * | 4/2015 | Sugiyama | ................ | F01P 7/14 123/568.12 |
| 2015/0273976 A1 * | 10/2015 | Enomoto | ................ | B60L 58/27 165/202 |
| 2016/0084593 A1 * | 3/2016 | Lee | ........................ | F28F 27/02 165/287 |
| 2016/0109163 A1 * | 4/2016 | Enomoto | ........... | B60H 1/32284 62/160 |
| 2016/0221414 A1 * | 8/2016 | Nakamura | ......... | B60H 1/00428 |
| 2016/0332505 A1 * | 11/2016 | Yamanaka | ......... | B60H 1/00428 |
| 2016/0339761 A1 * | 11/2016 | Enomoto | ........... | B60H 1/00278 |
| 2016/0339767 A1 * | 11/2016 | Enomoto | ........... | B60H 1/00278 |
| 2017/0016381 A1 * | 1/2017 | Yumisashi | .......... | F16K 31/0675 |
| 2017/0174045 A1 * | 6/2017 | Shimauchi | ......... | B60H 1/00864 |
| 2017/0203631 A1 * | 7/2017 | Ryu | ................ | B60H 1/00028 |
| 2017/0203635 A1 * | 7/2017 | Kuroda | .................... | F25B 5/02 |
| 2018/0272839 A1 * | 9/2018 | Kato | ...................... | B60H 1/08 |
| 2018/0339574 A1 * | 11/2018 | Sugimura | ................ | B60H 1/06 |

* cited by examiner

HEATING, VENTILATION AND AIR CONDITIONING SYSTEM OF VEHICLE

CROSS-REFERENCE TO RELATED APPLICATION

This application claims priority to and the benefit of Korean Patent Application No. 10-2018-0120830 filed in the Korean Intellectual Property Office on Oct. 11, 2018, the entire contents of which are incorporated herein by reference.

TECHNICAL FIELD

The present disclosure relates to a heating, ventilation and air conditioning (HVAC) system of a vehicle, and more particularly, the present disclosure relates to a HVAC system of a vehicle integrated with an exhaust gas recirculation (EGR) cooling circuit for improving EGR cooling performance.

BACKGROUND

Generally, a vehicle is equipped with an air conditioning system (HVAC: heating, ventilation and air conditioning) that can control temperature and humidity inside the vehicle interior to improve habitability of passengers.

In such an air conditioning system, a refrigerant is compressed by a compressor driven by power of an engine and supplied to a condenser, and in the condenser, the refrigerant is condensed by the forced blowing of a cooling fan. The refrigerant is circulated through the receiver dryer, the expansion valve, and the evaporator sequentially to the compressor again. In the circulation process of the refrigerant, the indoor or outdoor air is heat-exchanged with the refrigerant in the evaporator to reduce the temperature, and then the refrigerant is supplied to the interior of the vehicle, thereby cooling and dehumidifying the interior of the vehicle.

In addition, in case of the air conditioner system, a heater core is installed adjacent the evaporator so that some or all of the air passing through the evaporator is heated through the heater core and then discharged to the inside of the vehicle, thereby adjusting the temperature of the vehicle interior to the predetermined temperature of the passenger.

The heater core can use electricity as a heat source, but in some cases it is connected to the cooling circuit of the engine and uses as a heat source by supplying a high temperature coolant that cools the engine.

The EGR (Exhaust Gas Recirculation) cooler cools the EGR gas by exchanging the EGR gas with the engine coolant. There is a limit to cooling the EGR gas through only the heat exchange between the engine coolant and the EGR gas when the coolant temperature of the engine becomes high due to continuous running of the vehicle.

Therefore, it is necessary to utilize an air conditioning system of a vehicle to cool engine coolant and EGR gas in a short period of time effectively, thereby improving the engine performance.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide a heating, ventilation and air conditioning system of a vehicle capable of improving the cooling performance of an exhaust gas recirculation (EGR) cooler by cooling an engine coolant flowed into an EGR cooler through the air sent by a blower fan of the air conditioning system, if necessary.

A heating, ventilation, and air conditioning (HVAC) system of a vehicle according to an exemplary embodiment of the present disclosure may include: an indoor air conditioning circuit which produces to supply cooling air to a vehicle interior by heat-exchanging inflow air through an indoor air inlet or an outdoor air inlet with an evaporator, wherein the indoor air conditioning circuit is configured to supply warm air to the vehicle interior or to discharge to outside the vehicle interior by heat-exchanging inflow air with a heat exchanger. The heat exchanger may be connected with an engine cooling circuit so that engine coolant is used as a heat source of the heat exchanger.

A case having a first and a second discharge ports in which the evaporator and the heat exchanger are provided respectively, may be further included; and a first door which selectively opens or closes the indoor air inlet and the outdoor air inlet is installed to be rotatable inside the case.

A second door which controls the flow rate of the inflow air flowing to the heat exchanger and the evaporator may be installed to be rotatable inside the case.

A third discharge port communicated with the outside of the vehicle interior and a fourth discharge port communicated with the inside of the vehicle interior may be formed in the case so that the warm air heated through the heat exchanger can be selectively discharged to the outside of the vehicle interior or supplied to the inside of the vehicle interior; and a third door for selectively opening or closing the third discharge port and the fourth discharge port may be installed to be rotatable at the case.

The heat exchanger may be connected with an engine through a coolant supply passage so as to receive the engine coolant; and the heat exchanger may be connected with the engine through a coolant return passage so that the engine coolant heat-exchanged with the inflow air in the heat exchanger can be returned to the engine.

An EGR cooler for cooling EGR gas may be connected with the coolant supply passage through a first branch flow passage in order to receive the engine coolant through the coolant supply passage; and the EGR cooler may be connected with the coolant return passage through a second branch flow passage in order to return the engine coolant heat-exchanged with the EGR gas in the EGR cooler to the engine.

A first valve and a second valve for controlling the flow direction of the engine coolant may be installed at each branch portion of the first branch flow passage and the second branch flow passage.

A temperature sensor for sensing the temperature of the engine coolant flowed into the EGR cooler through the first branch flow passage may be installed in the first branch flow passage; and a coolant pump for pumping and supplying the engine coolant may be installed in the second branch flow passage.

In a first driving mode in which indoor air circulation, cooling the vehicle interior and cooling the EGR cooler are performed when the temperature of the vehicle interior is higher than a target temperature set by a passenger; the first door is pivoted to the outdoor air inlet to block the outdoor air inlet and open the indoor air inlet; the second door is pivoted between the heat exchanger and the evaporator depending on the difference between the temperature of the vehicle interior and the target temperature; the third door is pivoted to open the third discharge port and block the fourth discharge port; and the first valve and the second valves are operated to block the flow passage of the engine side and open the flow passage of the EGR cooler side.

In a second driving mode in which the indoor air circulation, cooling and heating and cooling EGR cooler are performed when the temperature of the vehicle interior and the target temperature are similar to each other; the first door is pivoted to the outdoor air inlet to block the outdoor air inlet and open the indoor air inlet; the second door is pivoted between the heat exchanger and the evaporator depending on the difference the temperature of the vehicle interior and the target temperature; the third door is pivoted to the third discharge port to block the third discharge port and open the fourth discharge port; and the first and second valves are operated to block the flow passage of the engine side and open the flow passage of the EGR cooler side.

In a third driving mode in which the indoor air circulation and heating in the vehicle interior are performed when the temperature of the vehicle interior is lower than the target temperature; the first door is pivot to the outdoor air inlet to block the outdoor air inlet and open the indoor air inlet; the second door is pivoted to the evaporator to block the air inflow toward the evaporator and allow the air inflow only toward the heat exchanger; the third door is pivoted to the third discharge port to block the third discharge port and open the fourth discharge port; and the first and second valves are operated to block the flow passage of the EGR cooler side and open the flow passage of the engine side.

The third driving mode may be switched to second driving mode when the temperature of the vehicle interior is raised up to the target temperature by performing the third driving mode.

In a fourth driving mode which is used for partial cooling of the vehicle interior and dehumidification, and used when the temperature of the vehicle interior is higher than the target temperature, and the outdoor air circulation, the cooling of the vehicle interior and the cooling of the EGR cooler are performed; the first door is pivoted to the indoor air inlet to block the indoor air inlet and open the outdoor air inlet; the second door is rotated at a predetermined angle so that a portion of the inflow air is cooled through the evaporator and then flowed into the vehicle interior to perform simultaneously the cooling and dehumidification, and the remaining air flows to the heat exchanger to cool the engine coolant in the heat exchanger; the third door is pivoted to open the third discharge port and block the fourth discharge port; and the first and second valves are operated to block the flow passage of engine side and open the flow passage of the EGR cooler side.

In a fifth driving mode used under severe driving condition such as towing or uphill driving of the vehicle; the first door is pivoted to the indoor air inlet to block the indoor air inlet and open the outdoor air inlet; the second door is pivoted to the evaporator to block the air inflow toward the evaporator and allow the air inflow only toward the heat exchanger; the third door is pivoted to the fourth discharge port to block the fourth discharge port and open the third discharge port; the first and second valves are operated to block the flow passage of the EGR cooler and open the flow passage of the engine side.

In accordance with a HVAC system of a vehicle according to an exemplary embodiment of the present disclosure, as the coolant of the EGR cooler is cooled separately from the engine cooling circuit by using the air conditioning circuit of the vehicle interior, variable operation of the blower fan is possible to achieve the target cooling temperature of the EGR gas depending on the engine driving condition.

In addition, the radiator disposed on the front of the vehicle can be used exclusively for the engine cooling circuit, thus improving the engine cooling performance, reducing the size of the radiator to improve the layout of the engine room, and improving pedestrian and low-speed collision response performance.

DETAILED DESCRIPTION OF THE EMBODIMENTS

An exemplary embodiment of the present disclosure will now be described in detail with reference to the accompanying drawing.

Figure 1:
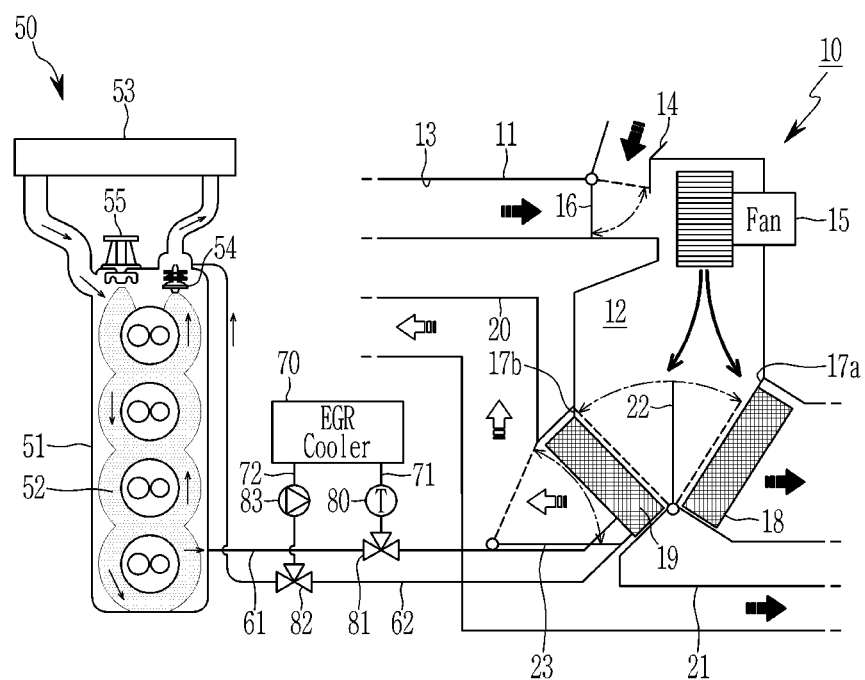
FIG. 1 is a schematic diagram of a heating, ventilation, and air conditioning (HVAC) system of a vehicle according to an exemplary embodiment of the present disclosure.

Referring to FIG. 1, a heating, ventilation, and air conditioning (HVAC) system of the vehicle according to an exemplary embodiment of the present disclosure includes: an air conditioning circuit 10, for heating or cooling outdoor or indoor air of a vehicle to blow the air into an interior of the vehicle to regulate the interior temperature of the vehicle, and connected via a heat exchanger with an engine cooling circuit 50 that circulates coolant to cool an engine so as to heat-exchange with the air conditioning circuit 10.

The air conditioning circuit 10 may include a case 11 in which a suction space 12 is formed at a predetermined size, and one side of the case 11 may include: an outdoor air inlet 13 which allows outdoor air to be flowed to the suction space 12; and an indoor air inlet 14 which allows indoor air to be flowed to the suction space 12.

A blower fan 15, which sucks air through the outdoor air inlet 13 or the indoor air inlet 14 to supply it to the suction space 12, may be provided at an inlet side of the suction space 12.

In addition, a first door 16 which selectively opens or closes the outdoor air inlet 13 and the indoor air inlet 14, may be installed to be rotatable via a hinge at a portion inside the case 11 between the outdoor air inlet 13 and the indoor air inlet 14.

When the first door 16 is rotated to one side to block the outdoor air inlet 13, the indoor air inlet 14 is opened so that the indoor air can be flowed into the suction space 12, and when the first door 16 is turned to the other side and blocks the indoor air inlet 14, the outdoor air inlet 13 is opened so that the outdoor air can be flowed into the suction space 12.

Two first and second discharge ports 17a and 17b may be provided inside the suction space 12.

The first discharge port 17a may be communicated with the vehicle interior so that the air for air conditioning may be flowed into the vehicle interior through the first discharge port 17a.

An evaporator 18 may be installed in the first discharge port 17a.

The evaporator 18 serves to cool the air for air conditioning by heat exchange with the air for air conditioning passing through the evaporator 18 by receiving the refrigerant.

That is, the air flowed into the suction space 12 heat-exchanges with the refrigerant in the evaporator 18 to be cooled and then blown to the vehicle interior, thereby cooling the vehicle interior.

The second discharge port 17b may be provided with a heat exchanger 19.

The heat exchanger 19 receives the coolant from the engine and heats the air for air conditioning by exchanging heat with the air for air conditioning passing through the heat exchanger 19.

The air, which is heated through the heat exchanger 19 passing through the second discharge port 17b, is exhausted to the outside of the vehicle through a third disport port 20 connected to the outside of the vehicle, or flowed into the vehicle interior through a fourth discharge port 21 communicated with the vehicle interior to heat the vehicle interior. That is, the second discharge port 17b communicates with the third discharge port 20 and the fourth discharge port 21.

On the other hand, a second door 22 may be rotatable via a hinge between the heat exchanger 19 and the evaporator 18, so that the outdoor air or indoor air sucked into the suction space 12 can only flow to the heat exchanger 19 or only to the evaporator 18 the second door 22 depending on the angle of rotation of the second door 22, and can simultaneously flow to the heat exchanger 19 and the evaporator 18, the flow rate thereof can be adjusted.

A third door 23 may be rotatable inside the case 11 via a hinge to regulate the flow rate of the air for air conditioning heated by the heat exchanger 19 and flowed to the third discharge port 20 and fourth discharge port 21.

That is, depending on the rotation angle of the third door 23, the air for air conditioning discharged from the heat exchanger 19 is discharged to the outside of the vehicle through the third discharge port 20, or discharged to the vehicle interior through the fourth discharge port 21 to heat the vehicle interior, and the flow rate of the air for air conditioning flowing through the third discharge port 20 and the flow rate of the air for air conditioning flowing through the fourth discharge port 21 can also be adjusted.

The engine cooling circuit 50 may include a water jacket 52 formed to allow the coolant to flow around a plurality of cylinders of the engine 51 that generates power by combusting the fuel, a radiator 53 for cooling the coolant by exchanging the coolant with surrounding air, a coolant flow control valve 54, such as a thermostat, which is provided between the radiator 53 and the water jacket 52 of the engine 51 and regulates the flow direction of the coolant, and a water pump 55 for pumping the coolant to forcibly circulate the coolant.

The water jacket 52 may be connected to the coolant inlet of the heat exchanger 19 via a coolant supply passage 61, and a heated coolant cooling the engine 51 is supplied to the heat exchanger 19 and can be used as a heat source for the heat exchanger 19.

Further, one end of the coolant return passage 62 may be connected to the coolant outlet of the heat exchanger 19, and the other end of the coolant return passage 62 is connected to the inlet of the coolant flow control valve 54 so that the coolant heat-exchanged in the heat exchanger 19 and cooled, can be flowed into the coolant flow control valve 54.

A first branch flow passage 71 branched from the coolant supply passage 61 may be connected to the inlet of an exhaust gas recirculation (EGR) cooler 70 so that the coolant that has cooled the engine 51 is supplied to the EGR cooler 70 and exchanges heat with the recirculating exhaust gas passing through the EGR cooler 70, thereby cooling the recirculating exhaust gas.

The coolant outlet of the EGR cooler 70 is connected to the coolant return passage 62 via a second branch passage 72 branching from the coolant return passage 62, so that the coolant having cooled the EGR cooler 70 combined with the coolant returned to the engine side through the heat exchanger 19 to return to the engine side.

A temperature sensor 80 for measuring the coolant temperature flowed to the EGR cooler 70 via the first branch flow passage 71 can be installed in the first branch passage flow 71, and a first valve 81, for example a 3-way valve, may be installed at a branch portion of the first branch flow passage 71 to adjust the flow direction of the coolant.

A second valve 82, for example a 3-way valve, may be also installed at a branch portion of the second branch flow passage 72 to adjust the flow direction of the coolant.

Accordingly, the first valve 81 controls the coolant inflow to the EGR cooler 70 and heat exchanger 19 of the coolant discharged from the engine 51, and the returning to the engine of the coolant passing through the EGR cooler 70 through the second valve 82 and the recirculation to the heat exchanger can be controlled.

The second branch flow passage 72 also has a coolant pump 83, for example an electric water pump, which forcedly circulate the coolant.

The temperature sensor 80 is connected to the input terminal of a controller which is not shown so that the controller senses the coolant temperature via the temperature sensor 80, and the coolant pump 83 and the first and second valves 81 and 82 are connected to the output terminal of the controller, control signals are received from the controller to control its operation.

According to the HVAC system of the above-described configuration, the present disclosure can operate in a plurality of driving modes as follows.

Figure 2:
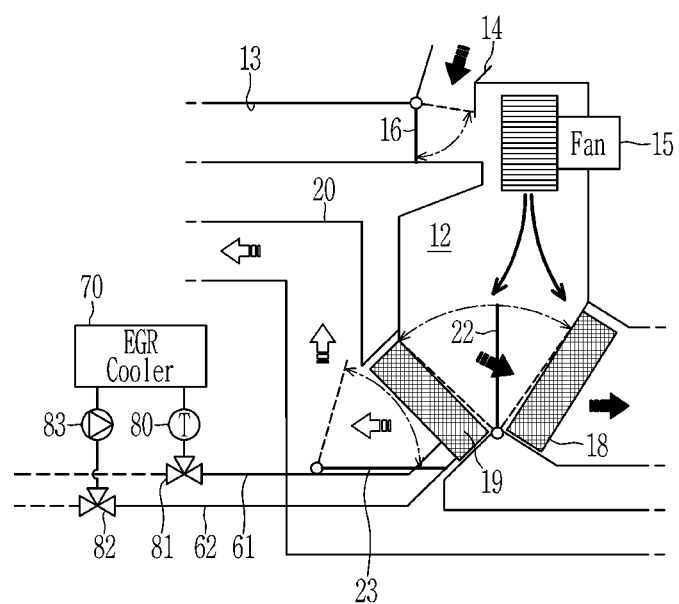
FIGS. 2, 3, 4, 5, and 6 are operating mode explanatory diagrams of the HVAC system of the vehicle according to an exemplary embodiment of the present disclosure.

A first driving mode shown in FIG. 2 is a mode used when, for example, the vehicle interior requires cooling, such as during the summer, and is operated when the temperature of the vehicle interior is significantly higher than the target temperature set by the passenger, a mode that indoor air circulation+indoor cooling+EGR cooling are achieved.

The first door 16 is pivoted to the outdoor air inlet 13 to block the outdoor air inlet 13 and open the indoor air inlet 14 to flow the inside air of the vehicle interior into the suction space 12 of the air conditioning case 11 by the operation of a blower fan 15.

Depending on the rotation of the second door 22, a portion of the air sucked into the suction space 12 is cooled through the evaporator 18 and then flowed into the vehicle interior to cool the inside of the vehicle interior and the remaining air flows to the heat exchanger 19 to cool the coolant through the heat exchanger 19.

The third door 23 is pivoted to open the third discharge port 20 and block the fourth discharge port 21 so that the air heated by heat exchanger with the coolant through the heat exchanger 19 is discharged to the outside of the vehicle interior through the third discharge port 20.

On the other hand, the first and second valves 81 and 82 to cut off the flow to the engine side and open the flow path to the EGR cooler 70 are operated so that the coolant existing between the EGR cooler 70 and the heat exchanger 19 circulates only the closed circuit between the cooler 70 and the heat exchanger 19 by the operation of the coolant pump 83.

Therefore, the coolant of the EGR cooler 70 is cooled by the heat exchange with the cooling air circulating in the vehicle interior so that the cooling performance of the EGR cooler is improved and the temperature of the EGR gas flowed into the engine through the EGR cooler 70 is appropriately reduced, thereby improving the engine performance.

The rotation angle of the first, second and third door 16, 22, and 23 can be controlled through the operation of the motor by the control signal of the controller.

Figure 3:
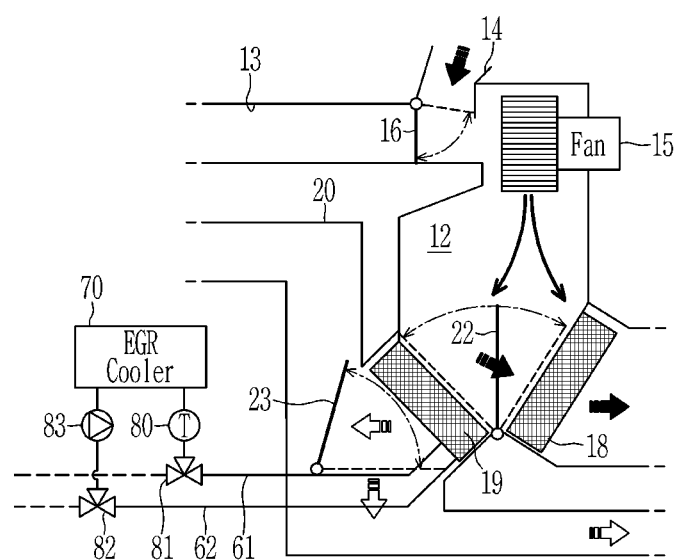

The second driving mode shown in FIG. 3 is a mode that operates when the temperature of the vehicle interior and target temperature are similar and a mode where indoor air circulation+cooling and heating+EGR cooling are performed.

In the second driving mode, the third door 23 is pivoted to the third discharge port 20 to shut off the third discharge port 20 and open the fourth discharge port 21 to pass through the heat exchanger 19 in the first driving mode, so that the warm air heated by passing through the heat exchanger 19 and the cold air cooled by passing through the evaporator 18 simultaneously flow into the vehicle interior to adjust the temperature of the vehicle interior to the target temperature.

At this time, the second door 22 is adjusted in accordance with the control signal of the controller so that the flow rate of the air flowing to the heat exchanger 19 and the flow rate of the air flowing to the evaporator 18 can be appropriately adjusted.

As in the first driving mode, the EGR cooling performance is improved even in the second driving mode.

Figure 4:
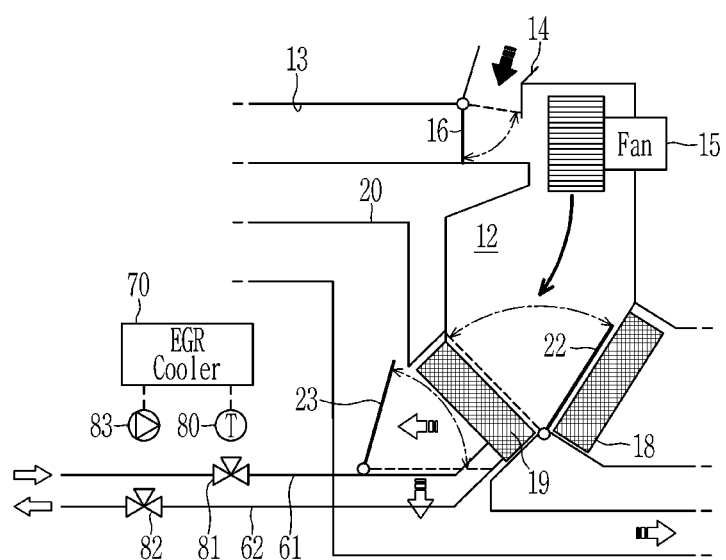

The third driving mode shown in FIG. 4 is a driving mode used when the temperature of the vehicle interior is lower than the target temperature of the user, for example, when emergency heating is required in the winter, and is an indoor air circulation+emergency heating mode.

The first door 16 is pivoted to the outdoor air inlet 13 to block the outdoor air inlet 13 and open the indoor air inlet 14 so that the air of the vehicle interior flows to the suction space 12 of the air conditioning case 11 by the operation of a blower fan 15.

The second door 22 is pivoted to the evaporator 18 to block the air inflow to the evaporator 18 and allowing the air to flow to only the heat exchanger 19.

The third door 23 is pivoted to the third discharge port 20 to shut off the third discharge port 20 and the fourth discharge port 21 is opened so that the air heated by heat exchange with the coolant through the heat exchanger 19 is discharged to the inside of the vehicle interior through the fourth discharge port 21 to heat the vehicle interior.

On the other hand, the first and second valves 81 and 82 simultaneously shut off the flow to the EGR cooler 70 and open the flow path to the engine so that the high temperature coolant cooling the engine does not flow to the EGR cooler 70 and flow to only the heat exchanger 19 so that the air of the vehicle interior is quickly heated by the coolant of the engine.

On the other hand, when the temperature of the vehicle interior is raised to a temperature similar to the target temperature, the second driving mode can be switched to the second driving mode to cool the EGR cooler 70 again.

Figure 5:
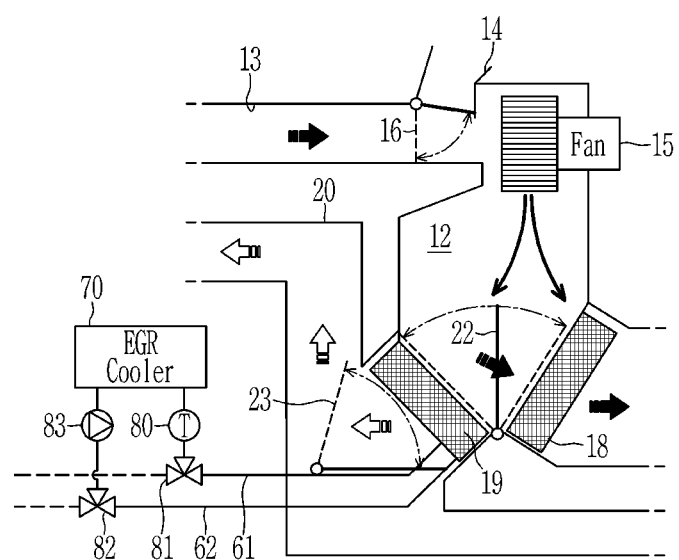

The fourth driving mode shown in FIG. 5 is, for example, a mode used for partial cooling and dehumidification of the vehicle interior, and is a mode that is operated when the temperature of the vehicle interior is significantly higher than the target temperature set by the occupant, and a mode where an outdoor air circulation+vehicle interior cooling+EGR cooling mode.

The first door 16 is pivoted to the indoor air inlet 14 to block the indoor air inlet 14 and open the outdoor air inlet 13 so that the outdoor air outside the vehicle is flowed into the suction space 12 of the air conditioning case 11 by the operation of the blower fan 15.

Depending on the rotation angle of the second door 22, a portion of the air sucked into the suction space 12 is cooled through the evaporator 18 and then flowed into the vehicle interior to allow cooling and dehumidification simultaneously and the remaining air flows to the heat exchanger 19 to cool the coolant in heat exchanger 19.

The third door 23 is pivoted to open the third discharge port 20 and block the fourth discharge port 21 so that the air heated by heat exchange with the coolant through the heat exchanger 19 is discharged to the outside of the vehicle through the third discharge port 20.

On the other hand, the first and second valves 81 and 82 cut off the flow path to the engine side and open the flow path to the EGR cooler 70 so that the coolant existing between the EGR cooler 70 and the heat exchanger 19 circulates only the closed circuit between the cooler 70 and the heat exchanger 19 by the operation of the coolant pump 83.

Therefore, the coolant of the EGR cooler 70 is cooled by the heat exchange with the cooling air circulating in the vehicle interior so that the cooling performance of the EGR cooler is improved, and the temperature of the EGR gas flowed into the engine through the EGR cooler 70 is appropriately reduced, thereby improving the engine output performance.

Figure 6:
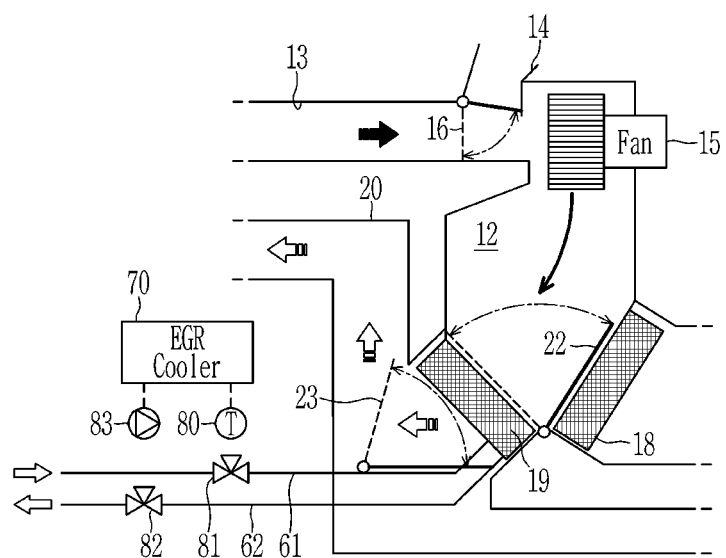

The fifth driving mode shown in FIG. 6 is a driving mode used under severe driving condition such as towing or uphill driving of a vehicle.

The first door 16 is pivoted to the indoor air inlet 14 and closes the indoor air inlet 14 and opens the outdoor air inlet 13 so that the indoor air of the vehicle interior is flowed by the operation of a blower fan 15 into the suction space 12 of the air conditioning case 11.

The second door 22 is pivoted to the evaporator 18 to block the air inflow to the evaporator 18 and the air inside the suction space 12 to flows to only the heat exchanger 19.

The third door 23 is pivoted to the fourth discharge port 21 to shut off the fourth discharge port 21 and the third discharge port 20 is opened so that the air heated by the heat exchange with the coolant through the heat exchanger 19 is discharged to the outside of the vehicle through the third discharge port 20.

On the other hand, the first and second valves 81 and 82 simultaneously shut off the flow passage to the EGR cooler 70 and open the flow path to the engine so that the high temperature coolant cooling the engine does not flow to the EGR cooler 70 and flows to only the heat exchanger 19.

As a result, the coolant of the engine 51 is cooled in the radiator 53 and also cooled in the heat exchanger 19, so that the coolant cooling efficiency of the engine can be improved by performing the double cooling.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A heating, ventilation, and air conditioning (HVAC) system of a vehicle, comprising:
   an indoor air conditioning circuit configured to supply cooling air to a vehicle interior by heat-exchanging inflow air through an indoor air inlet or an outdoor air inlet with an evaporator, and supply warm air to the vehicle interior or discharge warm air to outside the vehicle interior by heat-exchanging inflow air with a heat exchanger;
a case having first and second discharge ports, which include the evaporator and the heat exchanger, respectively, wherein the case includes:
   a first door, which selectively opens or closes the indoor air inlet and the outdoor air inlet, rotatably disposed inside the case; and
   a second door, which controls a flow rate of inflow air flowing to the heat exchanger and the evaporator, rotatably disposed inside the case,
wherein the heat exchanger is connected with an engine cooling circuit so that engine coolant is used as a heat source of the heat exchanger,
wherein the case further includes:
   a third discharge port communicating with the outside of the vehicle interior and a fourth discharge port communicating with an inside of the vehicle interior, so that the warm air heated through the heat exchanger is selectively discharged to the outside of the vehicle interior or supplied to the inside of the vehicle interior; and
   a third door, which selectively opens or closes the third discharge port and the fourth discharge port, rotatably disposed in the case,
wherein the heat exchanger is connected with an engine through a coolant supply passage to receive the engine coolant,
wherein the heat exchanger is connected with the engine through a coolant return passage so that the engine coolant heat-exchanged with inflow air in the heat exchanger can be returned to the engine,
wherein the HVAC system further comprises an exhaust gas recirculation (EGR) cooler, which cools EGR gas, connected with the coolant supply passage through a first branch flow passage to receive the engine coolant through the coolant supply passage,
wherein the EGR cooler is connected with the coolant return passage through a second branch flow passage to return the engine coolant, which is heat-exchanged with the EGR gas in the EGR cooler, to the engine,
wherein the first branch flow passage and the second branch flow passage include a first valve and a second valve, respectively, for controlling a flow direction of the engine coolant,
wherein the HVAC system further comprises:
   a temperature sensor disposed in the first branch flow passage and configured to sense a temperature of the engine coolant flowing into the EGR cooler through the first branch flow passage; and
   a coolant pump disposed in the second branch flow passage and configured to pump and supply the engine coolant,
wherein, when a temperature of the vehicle interior is higher than a target temperature that is set by a passenger, indoor air circulation, cooling of the vehicle interior, and cooling of the EGR cooler are performed in a first driving mode,
wherein in the first driving mode:
   the first door is pivoted to the outdoor air inlet to block the outdoor air inlet and to open the indoor air inlet,
   the second door is pivoted between the heat exchanger and the evaporator according to a difference between the temperature of the vehicle interior and the target temperature,
   the third door is pivoted to open the third discharge port and to block the fourth discharge port, and
   the first valve and the second valves block a flow path to the engine and open a flow path to the EGR cooler,
wherein the first, second, and third door are operated by motor controlled by a controller and the operation of the first and second valves is controlled by the controller.

2. The HVAC system of claim 1, wherein, when the temperature of the vehicle interior and the target temperature are the same, indoor air circulation, cooling and heating of the vehicle interior, and cooling of the EGR cooler are performed in a second driving mode,
   wherein, in the second driving mode:
      the first door is pivoted to the outdoor air inlet to block the outdoor air inlet and to open the indoor air inlet;
      the second door is pivoted between the heat exchanger and the evaporator according to the difference the temperature of the vehicle interior and the target temperature;
      the third door is pivoted to the third discharge port to block the third discharge port and to open the fourth discharge port; and
      the first and second valves are operated to block the flow path to the engine and to open the flow path to the EGR cooler.

3. The HVAC system of claim 1, wherein, when the temperature of the vehicle interior is lower than the target temperature, indoor air circulation and heating of the vehicle interior are performed in a third driving mode,
   wherein in the third driving mode:
      the first door is pivoted to the outdoor air inlet to block the outdoor air inlet and to open the indoor air inlet;
      the second door is pivoted to the evaporator to block the air inflow toward the evaporator and to allow the air inflow only toward the heat exchanger;
      the third door is pivoted to the third discharge port to block the third discharge port and to open the fourth discharge port; and
      the first and second valves are operated to block the flow path to the EGR cooler and to open the flow path to the engine.

4. The HVAC system of claim 3, wherein the third driving mode is switched to the second driving mode when the temperature of the vehicle interior increases to the target temperature in the third driving mode.

5. The HVAC system of claim 1, wherein, when the temperature of the vehicle interior is higher than the target temperature, dehumidification, outdoor air circulation, cooling of the vehicle interior, and cooling of the EGR cooler are performed in a fourth driving mode,
   wherein, in the fourth driving mode:
      the first door is pivoted to the indoor air inlet to block the indoor air inlet and to open the outdoor air inlet;
      the second door is rotated at a predetermined angle so that a portion of inflow air is cooled through the evaporator and then flowed into the vehicle interior to perform the cooling and dehumidification, simultaneously, and the remaining air flows to the heat exchanger to cool the engine coolant in the heat exchanger;
      the third door is pivoted to open the third discharge port and to block the fourth discharge port; and
      the first and second valves are operated to block the flow path to the engine and to open the flow path to the EGR cooler.

6. The HVAC system of claim 1, wherein, in a fifth driving mode used under a severe driving condition, which includes towing or uphill driving of the vehicle:
- the first door is pivoted to the indoor air inlet to block the indoor air inlet and to open the outdoor air inlet;
- the second door is pivoted to the evaporator to block the air inflow toward the evaporator and to allow the air inflow only toward the heat exchanger;
- the third door is pivoted to the fourth discharge port to block the fourth discharge port and to open the third discharge port; and
- the first and second valves block the flow path to the EGR cooler and open the flow path to the engine.

* * * * *